United States Patent
Carlough et al.

(10) Patent No.: US 8,140,607 B2
(45) Date of Patent: *Mar. 20, 2012

(54) METHOD FOR PROVIDING A DECIMAL MULTIPLY ALGORITHM USING A DOUBLE ADDER

(75) Inventors: Steven R. Carlough, Poughkeepsie, NY (US); Wen H. Li, Poughkeepsie, NY (US); Eric M. Schwarz, Gardiner, NY (US)

(73) Assignee: International Business Machines Corporation, Armonk, NY (US)

( * ) Notice: Subject to any disclaimer, the term of this patent is extended or adjusted under 35 U.S.C. 154(b) by 675 days.

This patent is subject to a terminal disclaimer.

(21) Appl. No.: 12/358,899

(22) Filed: Jan. 23, 2009

(65) Prior Publication Data
US 2009/0132629 A1    May 21, 2009

Related U.S. Application Data

(63) Continuation of application No. 11/054,567, filed on Feb. 9, 2005, now Pat. No. 7,519,647.

(51) Int. Cl.
*G06F 7/496* (2006.01)
(52) U.S. Cl. ........................................... 708/623
(58) Field of Classification Search ................. None
See application file for complete search history.

(56) References Cited

U.S. PATENT DOCUMENTS

| | | | |
|---|---|---|---|
| 3,629,565 A | 12/1971 | Schmookler et al. | |
| 3,644,724 A | 2/1972 | Angelov et al. | |
| 4,615,016 A | 9/1986 | Bradley et al. | |
| 4,677,583 A | 6/1987 | Ohtsuki et al. | |
| 4,745,569 A | 5/1988 | Yamaoka et al. | |
| 5,241,493 A | 8/1993 | Chu et al. | |
| 5,623,683 A | 4/1997 | Pandya | |
| 5,784,011 A | 7/1998 | Malladi et al. | |
| 6,282,556 B1 | 8/2001 | Chehrazi et al. | |
| 6,292,819 B1 | 9/2001 | Bultmann et al. | |
| 6,353,843 B1 | 3/2002 | Chehrazi et al. | |
| 7,475,104 B2 * | 1/2009 | Carlough et al. | 708/505 |
| 7,519,645 B2 * | 4/2009 | Carlough et al. | 708/505 |
| 2002/0169813 A1 * | 11/2002 | Pechanek et al. | 708/622 |
| 2005/0010631 A1 | 1/2005 | Carlough et al. | |
| 2006/0179099 A1 | 8/2006 | Carlough et al. | |
| 2006/0179101 A1 * | 8/2006 | Carlough et al. | 708/623 |
| 2006/0179102 A1 | 8/2006 | Carlough et al. | |
| 2009/0112960 A1 * | 4/2009 | Carlough et al. | 708/505 |
| 2009/0132627 A1 * | 5/2009 | Carlough et al. | 708/505 |
| 2009/0132628 A1 * | 5/2009 | Carlough et al. | 708/521 |

* cited by examiner

*Primary Examiner* — David H Malzahn
(74) *Attorney, Agent, or Firm* — Cantor Colburn LLP; John Campbell

(57) ABSTRACT

A method for performing decimal multiplication including storing a multiplier and a multiplicand in operand registers, the multiplier including one or more digits. A running sum is stored in a shifter and initialized to zero. The method includes performing for each of the digits in the multiplier in order from least significant digit to most significant digit: creating a partial product of the digit and the multiplicand and adding the partial product to the running sum. The running sum is output as the result of multiplying the multiplier and the multiplicand. The performing and outputting are implemented by a mechanism that includes one or more two cycle adders connected to the operand registers, multiplicand multiples circuitry connected to the operand registers, and a result digits register connected to the two cycle adders.

11 Claims, 4 Drawing Sheets

| Digit | Multiplicand Multiple $Ma_i$ | $Mb_i$ |
|---|---|---|
| 0 | 0 | 0 |
| 1 | 0 | 1 |
| 2 | 0 | 2 |
| 3 | 5 | -2 |
| 4 | 5 | -1 |
| 5 | 5 | 0 |
| 6 | 5 | 1 |
| 7 | 5 | 2 |
| 8 | 10 | -2 |
| 9 | 10 | -1 |

FIG. 1

| ADDL1 | $PP_3$ | $S_{n:4}$ | $PP_2$ | $S_{n:3}$ | $PP_1$ |
|---|---|---|---|---|---|
| ADDL2 | $S_{n:5}$ | $PP_3$ | $S_{n:4}$ | $PP_2$ | $S_{n:3}$ |
| ADDH1 | $PP_3$ | $S_{n:4}$ | $PP_2$ | $S_{n:3}$ | $PP_1$ |
| ADDH2 | $S_{n:5}$ | $PP_3$ | $S_{n:4}$ | $PP_2$ | $S_{n:3}$ |

FIG. 3

| ADDL1 | $PP_3$ | $10PP_2$ | $PP_1$ | $10PP_0$ | | | |
|---|---|---|---|---|---|---|---|
| ADDL2 | $10PP_4$ | $PP_3$ | $10PP_2$ | $PP_1$ | $10PP_0$ | | |
| ADDH1 | $S_{n:8}$ | $DPP_{5:4}$ | $S_{n:6}$ | $DPP_{3:2}$ | $S_{n:4}$ | $DPP_{1:0}$ | $S_{n:2}$ |
| ADDH2 | $DPP_{7:6}$ | $S_{n:8}$ | $DPP_{5:4}$ | $S_{n:6}$ | $DPP_{3:2}$ | $S_{n:4}$ | $DPP_{1:0}$ | $S_{n:2}$ |

FIG. 4

| Regs | G1 | G2 | G3 | G4 | G5 | G6 | G7 | G8 | G9 | G10 | G11 | G12 | G13 | G14 | ... |
|---|---|---|---|---|---|---|---|---|---|---|---|---|---|---|---|
| AH | | | | | | | | $PP_{15}$ | | $PP_{13}$ | $DPP_{14}$ | $PP_{11}$ | $DPP_{12}$ | $G14$ | ... |
| AL | A | A | | $MA_{15}$ | $MA_{14}$ | $MA_{13}$ | $MA_{12}$ | $MA_{11}$ | $MA_{10}$ | $MA_9$ | $MA_8$ | $MA_7$ | $MA_6$ | $MA_5$ | ... |
| BH | | | | | | | | $10PP_{14}$ | | $10PP_{12}$ | 0 | $10PP_{10}$ | $S_7$ | $10PP_8$ | ... |
| BL | $B_{15}$ | | | $MB_{15}$ | $MB_{14}$ | $MB_{13}$ | $MB_{12}$ | $MB_{11}$ | $MB_{10}$ | $MB_9$ | $MB_8$ | $MB_7$ | $MB_6$ | $MB_5$ | ... |
| Shifter | | | | | | | | | | | | $P_{15:14}$ | | $P_{15:12}$ | |
| Result digits | | | | | | | | | | | | | $r30:31$ | $r30:31$ | |
| Multiplier Register | B | $B_{14}$ | $B_{13}$ | $B_{12}$ | $B_{11}$ | $B_{10}$ | $B_9$ | $B_8$ | $B_7$ | $B_6$ | $B_5$ | $B_4$ | $B_3$ | $B_2$ | ... |
| MULT | | $B_{15}$ | $B_{14}$ | $B_{13}$ | $B_{12}$ | $B_{11}$ | $B_{10}$ | $B_9$ | $B_8$ | $B_7$ | $B_6$ | $B_5$ | $B_4$ | | ... |
| ADDH1 | | | | | | | | $DPP_{14}$ | | $DPP_{12}$ | $S_{15:14}$ | $DPP_{10}$ | $S_{15:12}$ | $DPP_8$ | ... |
| ADDL1 | | | | $PP_{15}$ | $10PP_{14}$ | $PP_{13}$ | $10PP_{12}$ | $PP_{11}$ | $PP_{11}$ | $PP_9$ | $PP_9$ | $PP_7$ | $10PP_6$ | $PP_5$ | ... |
| ADDH2 | | | | | | | $PP_{15}$ | | $DPP_{14}$ | | $10PP_{10}$ | $S_{15:14}$ | $DPP_{10}$ | $S_{15:12}$ | ... |
| ADDL2 | | | | | $PP_{15}$ | $10PP_{14}$ | $PP_{13}$ | $10PP_{12}$ | $PP_{11}$ | $DPP_{14}$ | $DPP_{14}$ | $DPP_{12}$ | $PP_9$ | $10PP_8$ | ... |
| CH | | | | | | | | | $PP_{13}$ | $DPP_{12}$ | $PP_{11}$ | $DPP_{10}$ | $PP_9$ | $DPP_{10}$ | ... |
| CL | | | | | | $PP_{15}$ | $10PP_{14}$ | $PP_{13}$ | $10PP_{12}$ | $PP_{11}$ | $10PP_{10}$ | $PP_9$ | $10PP_8$ | $PP_7$ | ... |

FIG. 5

METHOD FOR PROVIDING A DECIMAL MULTIPLY ALGORITHM USING A DOUBLE ADDER

CROSS-REFERENCE TO RELATED APPLICATION

This application is a continuation of U.S. patent application Ser. No. 11/054,567, filed on Feb. 9, 2005, now U.S. Pat. No. 7,519,647 the contents of which are incorporated by reference herein in their entirety.

TRADEMARKS

IBM® is a registered trademark of International Business Machines Corporation, Armonk, N.Y., U.S.A. S/390, Z900 and z990 and other names used herein may be registered trademarks, trademarks or product names of International Business Machines Corporation or other companies.

BACKGROUND

This invention relates to decimal floating point multiplication, and more particularly, to a floating point multiplier that utilizes a pipelined decimal adder.

As the speed of microprocessors continues to increase, the amount of computation that can be done in a single cycle decreases. For decimal floating point operations the carry chain for the wide adder prevents a full addition from being computed in a single cycle. One solution to prevent the decimal adder from limiting the performance of the computer system is to break the addition into two separate steps. Note that the IEEE 754R Standard defines two formats for decimal floating-point numbers, a doubleword format that contains a 16 digit coefficient and a quadword format that contains a 34 digit coefficient. Both formats also contain an exponent field and a sign bit.

Implementing a decimal multiplication operation with a two cycle adder creates complications for a multiplication algorithm. The multiplication will take twice as many clock cycles because the two cycle adder requires twice as many clock cycles. It would be desirable to be able to perform the multiplication in fewer clock cycles while still being able to utilize a two cycle adder. It is necessary to compute at least one partial product per cycle. The invention disclosed herein includes an algorithm for decimal multiplication that maintains the desired performance of an average of one partial product computation per cycle using a two cycle adder.

SUMMARY

Exemplary embodiments of the present invention include a system for performing decimal multiplication. The system includes input registers for inputting a multiplier and a multiplicand. The multiplier includes one or more digits. The system also includes one or more two cycle adders and a mechanism. The mechanism receives the multiplier and the multiplicand into the input registers. A running sum is reset to zero. The mechanism also performs for each of the digits in the multiplier in order from least significant digit to most significant digit: creating a partial product of the digit and the multiplicand; and adding the partial product to the running sum using the two cycle adders. When the loop is completed for each of the digits in the multiplier, the mechanism outputs the running sum as the result.

Additional exemplary embodiments include a system for performing decimal multiplication. The system includes input registers for inputting a multiplier and a multiplicand. The multiplier includes one or more sets of two digits. The most significant set may include one digit with a leading zero digit added to create the set of two digits, each set includes a first digit and a second digit, and the second digit is less significant than the first digit. The system also includes one or more two cycle adders and a mechanism. The mechanism receives the multiplier and the multiplicand into the input registers. A running sum is reset to zero. The mechanism performs for each set of the digits in the multiplier in order from the set containing the least significant digit to the set containing the most significant digit: creating a first digit partial product of the first digit in the set and the multiplicand; creating a second digit partial product of the second digit in the set and the multiplicand; adding the first digit partial product times ten to the second digit partial product using the two cycle adders and storing the result in a total partial product; and adding the total partial product to the running sum using the two cycle adders. When the loop is completed for each set of the digits, the mechanism outputs the running sum as the result.

Additional exemplary embodiments include a method for performing decimal multiplication. The method includes receiving a multiplier and a multiplicand. A running sum is reset to zero. The following loop is performed for each of the digits in the multiplier in order from least significant digit to most significant digit: creating a partial product of the digit and the multiplicand; and adding the partial product to the running sum using one or more two cycle adders. When the loop is completed for each of the digits in the multiplier, the running sum is output as the result.

Further exemplary embodiments include a method for performing decimal multiplication. The method includes receiving a multiplier and a multiplicand. The multiplier includes one or more sets of digits; the most significant set may include one digit with a leading zero digit added to create the set of two digits. Each set includes a first digit and a second digit, and the second digit is less significant than the first digit. A running sum is reset to zero. The following loop is performed for each of the digits in the multiplier in order from the set containing the least significant digit to the set containing the most significant digit: creating a first digit partial product of the first digit in the set and the multiplicand; creating a second digit partial product of the second digit in the set and the multiplicand; adding the first digit partial product times ten to the second digit partial product using the two cycle adders and storing the result in a total partial product; and adding the total partial product to the running sum using the two cycle adders. When the loop is completed for each set of the digits, the mechanism outputs the running sum as the result.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1 illustrates the multiples of the multiplicand which are summed to form a partial product of one multiplier digit by the multiplicand as utilized by exemplary embodiments of the present invention;

FIG. 3 illustrates an example timing sequence of a quad word, 34 digit, multiplication through the adder stages that may be utilized by exemplary embodiments of the present invention;

FIG. 4 illustrates an example timing sequence of a double word, 16 digit, multiplication through the adder stages that may be utilized by exemplary embodiments of the present invention; and FIG. 5 illustrates one example of a pipeline diagram for a decimal multiplication algorithm using a two cycle double adder that may be utilized by exemplary embodiments of the present invention.

Figure 2:
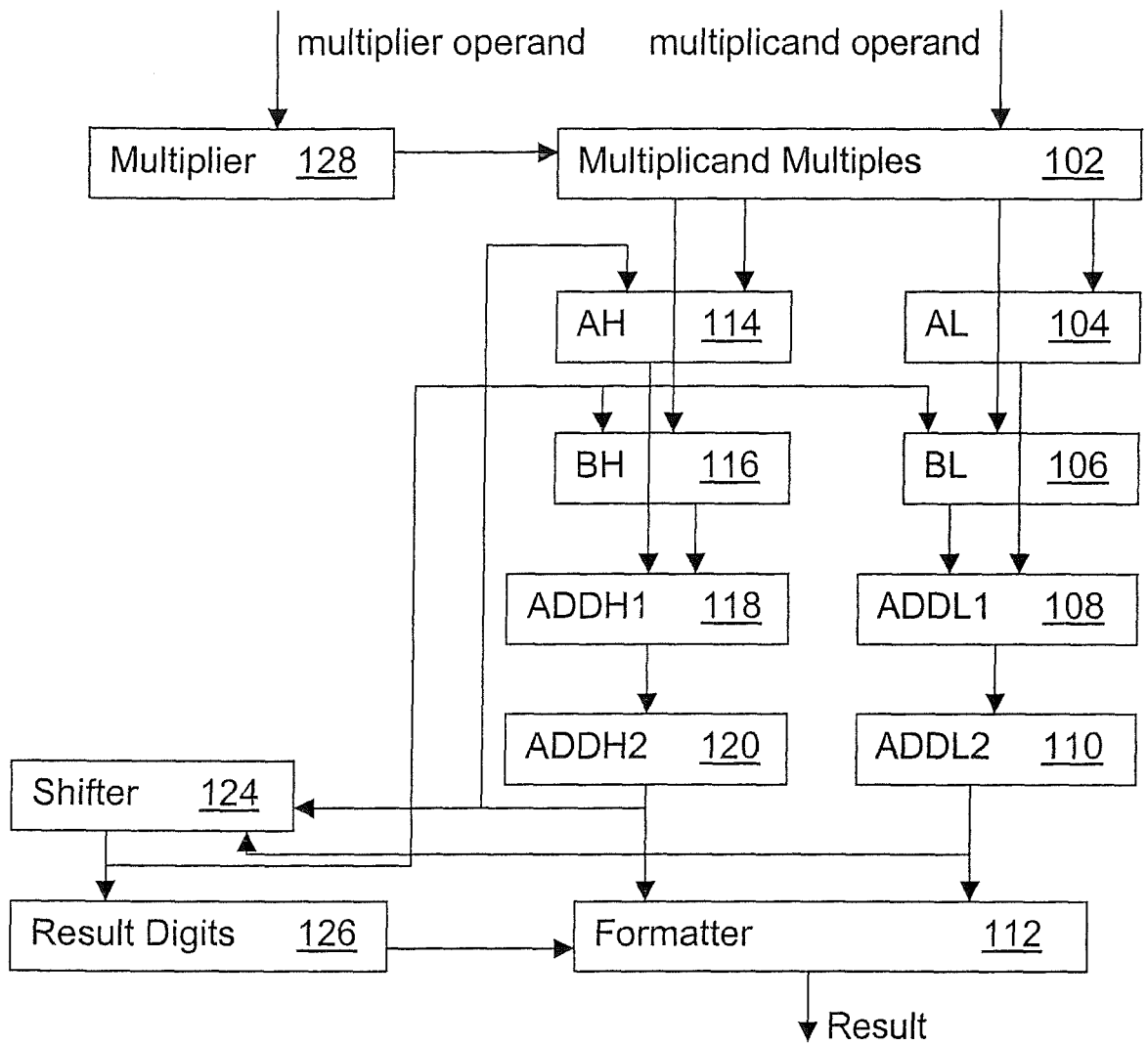
FIG. 2 illustrates one example of a hardware implementation of the decimal multiplication algorithm utilizing a two cycle adder that may be utilized by exemplary embodiments of the present invention.

The detailed description explains the preferred embodiments of the invention, together with advantages and features, by way of example with reference to the drawings.

DETAILED DESCRIPTION

Exemplary embodiments of the present invention include an algorithm for decimal multiplication that computes one partial product per cycle using a two cycle adder implementation. Prior to exemplary embodiments of the present invention, decimal multiplication was performed by creating one partial product per iteration and each iteration was limited in time by the delay of creating a partial product or the delay in accumulating the partial product. Adders are becoming the critical path in multiplication operations and very wide adders are beginning to take more than one clock cycle latency. Exemplary embodiments of the present invention are not limited by the latency of the adder and may be utilized to create and to accumulate one partial product per clock cycle rather than one partial product per adder latency. Exemplary embodiments of the present invention may be utilized for computing multiplication for both decimal floating point 64 bit formats (16 significant digits) and 128 bit formats (34 significant digits).

A typical multiplication process can be summarized as a summation of partial products from the following equation:

$$S = \sum_{i=0}^{n-1} PPi * 10^{n-1-i}.$$

The partial product terms may be generated from stored multiples of the multiplicand, as shown in FIG. 1, such that: PP(i)=MA(i)+MB(i). FIG. 1 illustrates the multiples of the multiplicand that are summed to form a partial product of one multiplier digit by the multiplicand as utilized by exemplary embodiments of the present invention. The multiplicand multiples include an A multiple and a B multiple.

FIG. 2 illustrates one example of a hardware implementation of a decimal multiplication algorithm utilizing a two cycle adder that may be utilized by exemplary embodiments of the present invention. A multiplier operand is input to a multiplier register 128 and a multiplicand operand is input to a multiplicand multiplies block 102. At the start of the multiplication, the multiplier register 128 performs a shift right and sends the least significant digit of the multiplier operand to the multiplicand multiples block 102. The least significant digit of the multiplier operand is replaced with one of the pairs of multiples depicted in FIG. 1. The pair of multiples (referred to herein as A and B) selected is based on the value of the least significant digit.

The multiplicand multiples block 102 creates two partial products from the product of A and the multiplicand and the product of B and the multiplicand. During a first and second cycle, the two partial products are added together using a two cycle adder. The AH register 114 stores the high bits of the partial product resulting from multiplying A and the multiplicand; the AL register 104 stores the low bits of the partial product resulting from multiplying A and the multiplicand. The BH register 116 stores the high bits of the partial product resulting from multiplying B and the multiplicand. The BL register 106 stores the low bits of the partial product resulting from multiplying B and the multiplicand.

Next, a two cycle adder is utilized to add the two partial products together. The first part of the addition of the contents of the AH register 114 and the contents of the BH register 116 is performed by the ADDH1 adder 118 during a first cycle. The second part of the addition of the contents of the AH register 114 and the contents of the BH register 116 is performed by the ADDH2 adder 120 during a second cycle. The resulting partial product from the ADDH2 adder 120 is input to a formatter 112, to a shifter 124 that contains the running sum and to the AH register 114. Similarly, the first part of the addition of the contents of the AL register 104 and the contents of the BL register 106 is performed by the ADDL1 adder 108 during the first cycle. The second part of the addition of the contents of the AL register 104 and the contents of the BL register 106 is performed by the ADDL2 adder 110 during a second cycle. The resulting partial product from the ADDL2 adder 110 is input to the formatter 112, to the shifter 124 that contains the running sum and to the AL register 104.

During a third and fourth cycle, the partial products are added to the running sum that is stored in the shifter 124. The output from the ADDH2 adder 120, the high bits of the partial product, is input to the AH register 114 and the output from the ADDL2 adder 110, the low bits of the partial product, is input to the AL register 104. The shifter 124 shifts out the running sum by one digit and aligns the running sum with the new partial product. The high bits of the running sum in the shifter 124 are input to the BH register 116 and the low bits of the running sum are input to the BL register 106. During the third cycle the first stage of the addition of the high bits of the partial product (in the AH register 114) and the high bits of the running sum (in the BH register 116) is performed by the ADDH1 adder 118. During the fourth cycle, the second stage of the addition of the high bits of the partial product and the high bits of the running sum is performed by the ADDH2 adder 120. Once all of the digits in the multiplier have been utilized to create a partial product, the shifter 124 outputs the running sum into a result digits register 126 for input to a formatter 112. In the formatter 112, result flags are generated, and if necessary, the exponent bias is adjusted based on the requirements described in the IEEE-754R floating point standard. The formatter 112 then recodes the result and outputs the result as a final result.

FIG. 3 illustrates an example timing sequence of a quad-word, 34 digit, multiplication through the adder stages that may be utilized by exemplary embodiments of the present invention. Using the method described above in reference to FIG. 2, one partial product term is created and accumulated every other cycle, as shown in FIG. 3. This is twice as fast as the four cycles described previously when a pipeline was not utilized.

Performance can be improved if two adders of P+2 digits are available, where P is the number of significant digits. For 16 digit operands, the 36 digit adder is split into two 18 digit adders, and the partial product terms are grouped into pairs (DPPi), as shown in the equations:

$$PP(2i+1) = MA(2i+1) + MB(2i+1)$$

$$10 * PP(2i) = 10 * MA(2i) + 10 * MB(2i)$$

$$DPP(2i: 2i+1) = 10PP(2i) + PP(2i+1)$$

$$S(n-1:2k) = \sum_{i=k}^{\frac{n-1}{2}} DPP(2i: 2i+1) * 100^{\frac{n-1}{2}-i}$$

$$FullSum = S(n-1:0) = \sum_{i=0}^{\frac{n-1}{2}} DPP(2i: 2i+1) * 100^{\frac{n-1}{2}-i}$$

FIG. 3 shows that an average of one multiplier digit may be computed every cycle by pipelining the algorithm. In FIG. 3, the partial products are formed (e.g., 10PP(2i) and PP(2i+1)) in the low order hardware, and the partial product pair (e.g., DPP) and running summations are computed in the high order hardware.

The example hardware implementation of the decimal multiplication algorithm utilizing a two cycle double adder is shown in FIG. 2. The multiplicand multiples block 102 can output multiples for a multiplicand operand of 16 or 34 digits. The multiplicand multiples block 102 has two outputs, MAi and MBi, such that the low order 16 digits of these outputs are stored in the AL register 104 and BL register 106, respectively, and the high order 16 digits are stored in the AH register 114 and BH 116. The multiples of the operand generated on each output of the outputs depend on the input digit such that when the two outputs are added or subtracted from each other, any multiple from 0 to 9 times the input operand is possible as shown in FIG. 1. Likewise this output may be shifted four bits to the left making ten times these values available as well.

In exemplary embodiments of the present invention, the AH register 114 and the AL register 104 are each 18 digit registers and connect to the operand A inputs of the ADDH1 adder 118 and ADDL1 adder 108, respectively. The BL register 116 and BH register are each 18 digit registers and connect to the operand B inputs of the ADDH1 adder 118 and ADDL1 adder 108, respectively. The ADDH1 adder 118 and the ADDL1 adder 108 are the high order and low order halves of the first stage of a two cycle double adder. The ADDH1 adder 118 and the ADDL1 adder 108 generate 18 digit sums when 16 digits operands are processed or 36 digit sums when 34 digit operands are processed. The output of the ADDH1 adder 118 and the ADDL1 adder 108 are connected to the ADDH2 adder 120 and the ADDL2 adder 110, respectively. The ADDH2 adder 120 and the ADDL2 adder 110 are the second stage of a pipelined two cycle decimal adder and generate the final results of two 18 digits summations or one 36 digit summation.

The output of the ADDL2 adder 110 is connected to the AL register 104, the BH register 116, and the formatter 112. The output of ADDH2 adder 120 is connected to the formatter 112, the AH register 114, and the shifter 124. The shifter 124 is a four or eight bit right shifter that is connected to the result digits register 126, the BH register 116, and the BL register 106. The result digits shifted out of the shifter 124 are saved in the result digits register 126. The multiplier operand input is sent to the multiplier register 128. The multiplier register 128 sends one multiplier digit to the multiplicand multiples block 102 per cycle. The formatter 112 aligns the upper digits of the result from the ADDH2 adder 120 and the ADDL2 adder 110 with the low order result digits saved in the result digits register 126 and outputs the result (e.g., via a result bus). The shifter 124 shifts the input two digits to the right, shifting in zeros to the two most significant digit locations, and this data is sent to the BH register 116. The two digits in the least significant positions before they are shifted by shifter 124, are sent to the two most significant digits of the BL register 106.

FIG. 4 illustrates an example timing sequence of a double word, 16 digit, multiplication through the adder stages that may be utilized by exemplary embodiments of the present invention. In the low part of the adder, new partial products are created every cycle. Every other partial product created is multiplied by ten; this is done in the multiplicand multiples block 102 by shifting the multiples of the multiplicand to be summed by one digit to the left. In the high part of the adder, partial product pairs, DPP(j:j+1), where the two consecutive partial products PP(j) and PP(j+1) are summed every other cycle, and in the interleaved cycles, partial product pairs are accumulated to the full sum, S(n:k), where n:k denotes the number of the partial products accumulated (from PP(n) to PP(k)).

The multiplicand is written to the multiplicand multiples block 102 from FIG. 2 and the multiplier is written to the multiplier register 128 in FIG. 2. In the next step, the number of significant digits in the multiplier register 128 is checked to determine how many multiplication iterations are necessary to process all of the digits (that number being half the number of significant digits rounded up). Next a check is made to see if all of the digits have been processed; if there are still more digits to be processed, then the algorithm proceeds to read the least significant digit of the multiplier register 128. The multiplicand multiples are generated in the multiplicand multiples block 102. The two multiples are then added or subtracted depending on the value of the digit being processed in the ADDL1 adder 108.

The multiplier register 128 is shifted one digit to the right such that the least significant digit is shifted out. Next, the new least significant digit of the multiplier register 128 is read. The multiples of the multiplicand are read from the multiplicand multiples block 102 based on the value of the digit read. The two multiples are multiplied by 10, which constitutes a shift of one digit to the left. The two multiples are added or subtracted, based on the value of the digit from the multiplier register 128 in the ADDL1 adder 108. The paired partial products are added to form a partial product pair. The result is sent to the AH register 114. The accumulated pairs are sent to the shifter 124 where they are shifted two digits to the right, and the least significant two digits are sent to result digits register 126.

The algorithm then determines if all of the digits have been processed. If they have not all been processed, the next iteration begins. If they have all been processed, then the result exponent is computed. The digits computed in the multiplication iterations currently in the result digits register 126 and the ADDH1 adder 118 are aligned, merged together, and, if necessary, the results are rounded to the target precision. Result flags are generated and, if necessary, the exponent bias is adjusted based on the requirements described in the IEEE-754R floating point standard. Finally, the result is recoded and written to the target destination.

The same kind of processing described in reference to FIG. 4 may be implemented for quadwords by providing more adders (e.g., two more adders) to the quadword implementation described above. Then, a sum may be produced every cycle for the quadword implementation, instead of every other cycle as described above.

FIG. 5 illustrates one example of a pipeline diagram for a decimal multiplication algorithm using a two cycle double adder that may be utilized by exemplary embodiments of the present invention. It shows the pipeline diagram of the multiplication algorithm for the coefficients of double precision operands. The algorithm begins with a decode sequence (not shown) where the operands are converted from the IEEE 754 Decimal Floating Point format to Binary Coded Decimal Numbers. Next, a setup sequence of three cycles initializes the hardware and loads the multiplicand into the multiplicand multiples block 102. During this setup sequence the first pair of multiplicand multiples, which form the first partial product, is processed. The algorithm then continues processing an average of one partial product per cycle.

The pipeline begins in cycle G4 where multiplicand digit B13 is read from the least significant digit of the multiplier register 128 and is sent to the multiplicand multiples block 102 to look up the multiplicand multiples MA13 and MB13 needed for that partial product. The multiplier register 128 is shifted to the right one digit. On cycle G5, B12 is read from the least significant digit of multiplier register 128 and sent to the multiplicand multiples block 102 to look up the multiplicand multiples MA12 and MB12 needed for that digit. MA13 and MB13 multiples are generated in the multiplicand multiples block 102 and sent to AL register 104 and the BL register 106, respectively. On cycle G6, MA13 and MB13 are latched into the AL register 104 and the BL register 106, respectively and are sent to ADDL1 adder 108 where they are summed together to form PP13. MA12 and MB12 are shifted one digit to the left and sent to the AL register 104 and the BL register 106, respectively.

On cycle G7, PP13 is sent through the ADDL2 adder 110, and MA12 and MB12 are sent to the ADDL1 adder 108 to form PP12. On cycle G8, PP13 is latched in CL (which is an output staging latch of the ADDL2 adder 110), and PP12 is sent to the ADDL2 adder 110 to complete the summation. On cycle G9, PP13 is sent to CH (which is an output staging latch of the ADDH2 adder 120) and PP12 is sent to CL. On Cycle G10, PP13 is sent to the AH register 114 and PP12 is sent to the BH register 116 where it is sent though the ADDH1 adder 118 to form DPP12. On cycle G11, DPP13:12 is sent to the ADDH2 adder 120, and in cycle G12, DPP13:12 is sent to CH. On cycle G13, DPP13:12 is sent to the AH register 114 and DPP15:14 previously computed in the previous iteration is sent to the BH register 116. The two values are added together in the ADDH1 adder 118 to form S15:12.

On cycle G14, S15:12 is sent to the ADDH2 adder 120. On cycle G15, S15:12 is shifted right two digits such that the two least significant digits (r28:r29) are shifted out and saved to the most significant two digits of result digits register 126 (refer to r30:r31 processed on the previous iteration when DPP15:14 was processed). Likewise on cycle G15, this shifted version of S15:12 is sent to the BH register 116 for summation with DPP11:10 for the next iteration (refer to DPP15:14 in cycle G13). Processing continues in this manner until all of the digits of the multiplier have been processed in cycle G25. On cycle G26, the data is aligned and merged together.

Exemplary embodiments of the present invention may be utilized to improve the performance of multipliers that utilize two cycle adders. By pipelining the process a sum may be created every other cycle or every cycle, depending on the number of adders utilized. In this manner, more multiply operations may be performed in a shorter elapsed time, leading to increased performance of the computer system.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention, can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for performing decimal multiplication, the method comprising:
    storing a multiplier and a multiplicand in operand registers, the multiplier including one or more digits;
    storing a running sum in a shifter, the running sum initialized to zero;
    performing for each of the digits in the multiplier in order from least significant digit to most significant digit:
        creating a partial product of the digit and the multiplicand; and
        adding the partial product to the running sum; and
    outputting the running sum as the result of multiplying the multiplier and the multiplicand, wherein the performing and outputting are implemented by a mechanism that includes one or more two cycle adders connected to the operand registers, multiplicand multiples circuitry connected to the operand registers, and a result digits register connected to the two cycle adders.

2. The method of claim 1 wherein the performing and outputting are pipelined and the creating a partial product is performed every other cycle.

3. The method of claim 2 wherein the adding the partial product to the running sum is performed every other cycle.

4. The method of claim 1 wherein the creating a partial product includes:
    correlating each multiplier digit with a corresponding multiple pair of the multiplicand, the multiple pair including an A multiple and a B multiple, wherein the sum of the A multiple and the B multiple is the multiplicand multiple that makes up the partial product;

creating a first partial product of the digit and the A multiple;

creating a second partial product of the digit and the B multiple; and adding the first partial product and the second partial product using the two cycle adders and storing the result in the partial product.

5. The method of claim 4 wherein the two cycle adders include a first adder for adding the low bits of the first partial product and the second partial product, and a second adder for adding the high bits of the first partial product and the second partial product.

6. A method for performing decimal multiplication, the method comprising: storing a multiplier and a multiplicand in operand registers, the multiplier including one or more sets of two digits, the most significant set may include one digit with a leading zero digit added to create the set of two digits, each set includes a first digit and a second digit, and the second digit is less significant than the first digit;

storing a running sum in a shifter, the running sum initialized to zero; and performing for each set of the digits in the multiplier in order from the set containing the least significant digit to the set containing the most significant digit:

creating a first digit partial product of the first digit in the set and the multiplicand;

creating a second digit partial product of the second digit in the set and the multiplicand;

adding the first digit partial product times ten to the second digit partial product and storing the result as a total partial product; and adding the total partial product to the running sum; and outputting the running sum as the result of multiplying the multiplier and the multiplicand, wherein the performing and outputting are implemented by a mechanism that includes one or more two cycle adders connected to the operand registers, multiplicand multiples circuitry connected to the operand registers, and a results digits register connected to the two cycle adders.

7. The method of claim 6 wherein the performing and outputting are pipelined and the creating a total partial product is performed an average of every cycle.

8. The method of claim 7 wherein the adding the total partial product to the running sum is performed an average of every cycle.

9. The method of claim 6 wherein the creating the first digit partial product includes:

correlating each multiplier digit with a corresponding multiple pair of the multiplicand, the multiple pair including an A multiple and a B multiple, wherein the sum of the A multiple and the B multiple is the multiplicand multiple that makes up the partial product;

creating a first partial product of the digit and the A multiple;

creating a second partial product of the digit and the B multiple; and adding the first partial product and the second partial product using the two cycle adders and storing the result in the first digit partial product.

10. The method of claim 6 wherein the creating the second digit partial product includes:

correlating each multiplier digit with a corresponding multiple pair of the multiplicand, the multiple pair including an A multiple and a B multiple, wherein the sum of the A multiple and the B multiple is the multiplicand multiple that makes up the partial product;

creating a first partial product of the digit and the A multiple;

creating a second partial product of the digit and the B multiple; and adding the first partial product and the second partial product using the two cycle adders and storing the result in the second digit partial product.

11. The method of claim 6 wherein the two cycle adders include a first adder for adding the low bits of the first partial product and the second partial product, and a second adder for adding the high bits of the first partial product and the second partial product.

* * * * *